US010439224B2

(12) United States Patent
Nagano

(10) Patent No.: US 10,439,224 B2
(45) Date of Patent: Oct. 8, 2019

(54) POSITIVE ELECTRODE FOR NON-AQUEOUS ELECTROLYTE SECONDARY BATTERY AND NON-AQUEOUS ELECTROLYTE SECONDARY BATTERY USING THE SAME

(71) Applicant: NISSAN MOTOR CO., LTD., Yokohama-shi, Kanagawa (JP)

(72) Inventor: Kodai Nagano, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 60 days.

(21) Appl. No.: 14/906,812

(22) PCT Filed: Jul. 24, 2014

(86) PCT No.: PCT/JP2014/069621
§ 371 (c)(1),
(2) Date: Jan. 21, 2016

(87) PCT Pub. No.: WO2015/012375
PCT Pub. Date: Jan. 29, 2015

(65) Prior Publication Data
US 2016/0164101 A1 Jun. 9, 2016

(30) Foreign Application Priority Data
Jul. 24, 2013 (JP) .................................. 2013-153770

(51) Int. Cl.
*H01M 4/62* (2006.01)
*H01M 4/131* (2010.01)
(Continued)

(52) U.S. Cl.
CPC ........... *H01M 4/625* (2013.01); *H01M 2/026* (2013.01); *H01M 4/131* (2013.01);
(Continued)

(58) Field of Classification Search
CPC .. H01M 2/026; H01M 2/0275; H01M 2/0285; H01M 2/1653; H01M 2/1686;
(Continued)

(56) References Cited

U.S. PATENT DOCUMENTS 6,379,402 B1 * 4/2002 Suhara .................... H01G 9/155
29/25.03
9,819,050 B2 * 11/2017 Saito ........................ H01M 4/13
(Continued)

FOREIGN PATENT DOCUMENTS

JP  H07-122262 A  5/1995
JP  2000-156231 A  6/2000
(Continued)

OTHER PUBLICATIONS

Kang et al. ("A Comparison of High Capacity xLi2MnO3●(1–x)LiMO2 (M=Ni, Co, Mn) Cathodes in Lithium-Ion Cells with Li4Ti5O12- and Carbon-Encapsulated Anatase TiO2 Anodes"pp. A267-A271).*
(Continued)

*Primary Examiner* — Milton I Cano
*Assistant Examiner* — Abibatu O Ojo-Amoo
(74) *Attorney, Agent, or Firm* — Young Basile Hanlon & MacFarlane, P.C.

(57) ABSTRACT

A positive electrode for non-aqueous electrolyte secondary battery suppresses a decrease in discharge capacity under a high output condition while minimizing an increase in battery temperature in an overcharged state of the battery. The positive electrode includes: a positive electrode current collector; and a positive electrode active material layer that is formed on a surface of the positive electrode current collector, contains a positive electrode active material and a conductive aid, and has a BET specific surface area of from 1 to 3 $m^2/g$, in which the conductive aid contains a first conductive aid and a second conductive aid having a larger
(Continued)

average particle diameter than the first conductive aid. The content of the first conductive aid is greater than the content of the second conductive aid in the positive electrode active material layer.

11 Claims, 2 Drawing Sheets

(51) Int. Cl.
*H01M 2/02* (2006.01)
*H01M 4/58* (2010.01)
*H01M 4/36* (2006.01)
*H01M 4/505* (2010.01)
*H01M 4/525* (2010.01)
*H01M 4/587* (2010.01)
*H01M 10/0525* (2010.01)
*H01M 4/02* (2006.01)
*H01M 2/16* (2006.01)

(52) U.S. Cl.
CPC ........ *H01M 4/5825* (2013.01); *H01M 2/0262* (2013.01); *H01M 2/0275* (2013.01); *H01M 2/1653* (2013.01); *H01M 2/1686* (2013.01); *H01M 4/364* (2013.01); *H01M 4/505* (2013.01); *H01M 4/525* (2013.01); *H01M 4/587* (2013.01); *H01M 10/0525* (2013.01); *H01M 2004/021* (2013.01); *H01M 2220/20* (2013.01); *H01M 2220/30* (2013.01); *Y02E 60/122* (2013.01)

(58) Field of Classification Search
CPC ...... H01M 4/131; H01M 4/505; H01M 4/525; H01M 4/625; H01M 4/52; H01M 10/0525
See application file for complete search history.

(56) References Cited

U.S. PATENT DOCUMENTS

| | | | | |
|---|---|---|---|---|
| 2001/0026885 A1* | 10/2001 | Kitoh | ...................... | H01M 4/13 429/94 |
| 2002/0168574 A1* | 11/2002 | Ahn | ...................... | H01M 4/139 429/232 |
| 2004/0101756 A1* | 5/2004 | Koyama | ............... | H01M 4/133 429/231.8 |
| 2007/0202405 A1* | 8/2007 | Shizuka | ................ | H01M 4/505 429/231.3 |
| 2011/0033754 A1* | 2/2011 | Shimizu | .............. | H01M 2/1646 429/231.95 |

FOREIGN PATENT DOCUMENTS

| | | |
|---|---|---|
| JP | 2000-277095 A | 10/2000 |
| JP | 2004-022177 A | 1/2004 |
| JP | 2005-251684 A | 9/2005 |
| JP | 2006179367 A | 7/2006 |
| JP | 2009-151959 A | 7/2009 |
| JP | 2010080105 A | 4/2010 |
| JP | 2011-238415 A | 11/2011 |
| JP | 2013-084525 A | 5/2013 |

OTHER PUBLICATIONS

Taniguchi et al. (Electrochemical properties of $LiM1/6 Mn11/6 O4$ (M=Mn, Co, Al, and Ni) as cathode materials for Li-ion batteries prepared by Ultrasonic Spray pyrolysis method, pp. 333-339).*
Machine Translation of JP 2000277095 A, Yamane Yuriko et al. extracted on the Jul. 28, 2017.*

* cited by examiner

POSITIVE ELECTRODE FOR NON-AQUEOUS ELECTROLYTE SECONDARY BATTERY AND NON-AQUEOUS ELECTROLYTE SECONDARY BATTERY USING THE SAME

CROSS REFERENCE TO RELATED APPLICATION

This application claims priority to Japanese Patent Application No. 2013-153770 (filed on Jul. 24, 2013), herein incorporated by reference.

TECHNICAL FIELD

The present invention relates to a positive electrode for non-aqueous electrolyte secondary battery and a non-aqueous electrolyte secondary battery using the same.

BACKGROUND

Currently, a non-aqueous electrolyte secondary battery including a lithium ion secondary battery that is utilized for a mobile device such as a mobile phone is available as a commercial product. The non-aqueous electrolyte secondary battery generally has a constitution that a positive electrode having a positive electrode active material and the like coated on a current collector and a negative electrode having a negative electrode active material and the like coated on a current collector are connected to each other via an electrolyte layer in which a non-aqueous electrolyte solution or a non-electrolyte gel is held in a separator. The charge and discharge reactions of a battery occur as the ions such as lithium ions are absorbed into and desorbed from an electrode active material.

In recent years it has been desired to reduce the amount of carbon dioxide in order to cope with the global warming. Hence, a non-aqueous electrolyte secondary battery having a small environmental burden has been utilized not only in a mobile device but also in a power source device of electric vehicles such as a hybrid vehicle (HEV), an electric vehicle (EV), and a fuel cell vehicle.

As the non-aqueous electrolyte secondary battery for application to the electric vehicles, it is required to have a high output and a high capacity. Hence, intensive research and development have been underway in order to develop a technology which satisfies such performances. For example, a means for solving the problem that the discharge capacity decreases particularly at the time of high output (or high current) discharge when the film thickness of the electrode active material is at a certain degree or more in the case of using a powdered electrode active material is provided in JP-A-H07-122262. Specifically, the above problem is solved by setting the specific surface area of the electrode in the non-aqueous electrolyte secondary battery to 4 $m^2/g$ or more in JP-A-H07-122262. Incidentally, it is discussed in JP-A-H07-122262 that voids in the electrode increases as the specific surface area is set to 4 $m^2/g$ or more, and a decrease in discharge capacity even under a high output condition is prevented as the ionic conduction is secured.

SUMMARY

As the technology described in JP-A-H07-122262, it is preferable to increase the specific surface area of the electrode since it can contribute to the improvement in lifespan characteristics of the battery. However, according to the research by the present inventors, it has been found out that there is a problem that the temperature of the battery increases if the battery is overcharged, when a non-aqueous electrolyte secondary battery is constituted using an electrode (especially, the positive electrode) having a large specific surface area.

Accordingly, an object of the present invention is to provide a means capable of suppressing a decrease in discharge capacity under a high output condition while minimizing an increase in battery temperature in an overcharged state of the battery.

Solution to Problem

The present inventors have carried out intensive researches in view of the above problem. As a result, it has been found out that the above problem can be solved by using a conductive aid in the positive electrode active material layer, controlling the BET specific surface area to a predetermined value, using two or more kinds of conductive aids having different average particle diameters as the conductive aid, and controlling the relationship of the contents of the conductive aids, thereby completing the present invention.

In other words, according to an aspect of the present invention, a positive electrode for non-aqueous electrolyte secondary battery including a positive electrode current collector and a positive electrode active material layer that is formed on the surface of the positive electrode current collector and contains a positive electrode active material and a conductive aid is provided. Here, the BET specific surface area of the positive electrode active material layer is from 1 to 3 $m^2/g$, the conductive aid contains a first conductive aid and a second conductive aid having a larger average particle diameter than the first conductive aid, and the content of the first conductive aid is greater than the content of the second conductive aid in the positive electrode active material layer.

DESCRIPTION OF THE EMBODIMENTS

Figure 1:
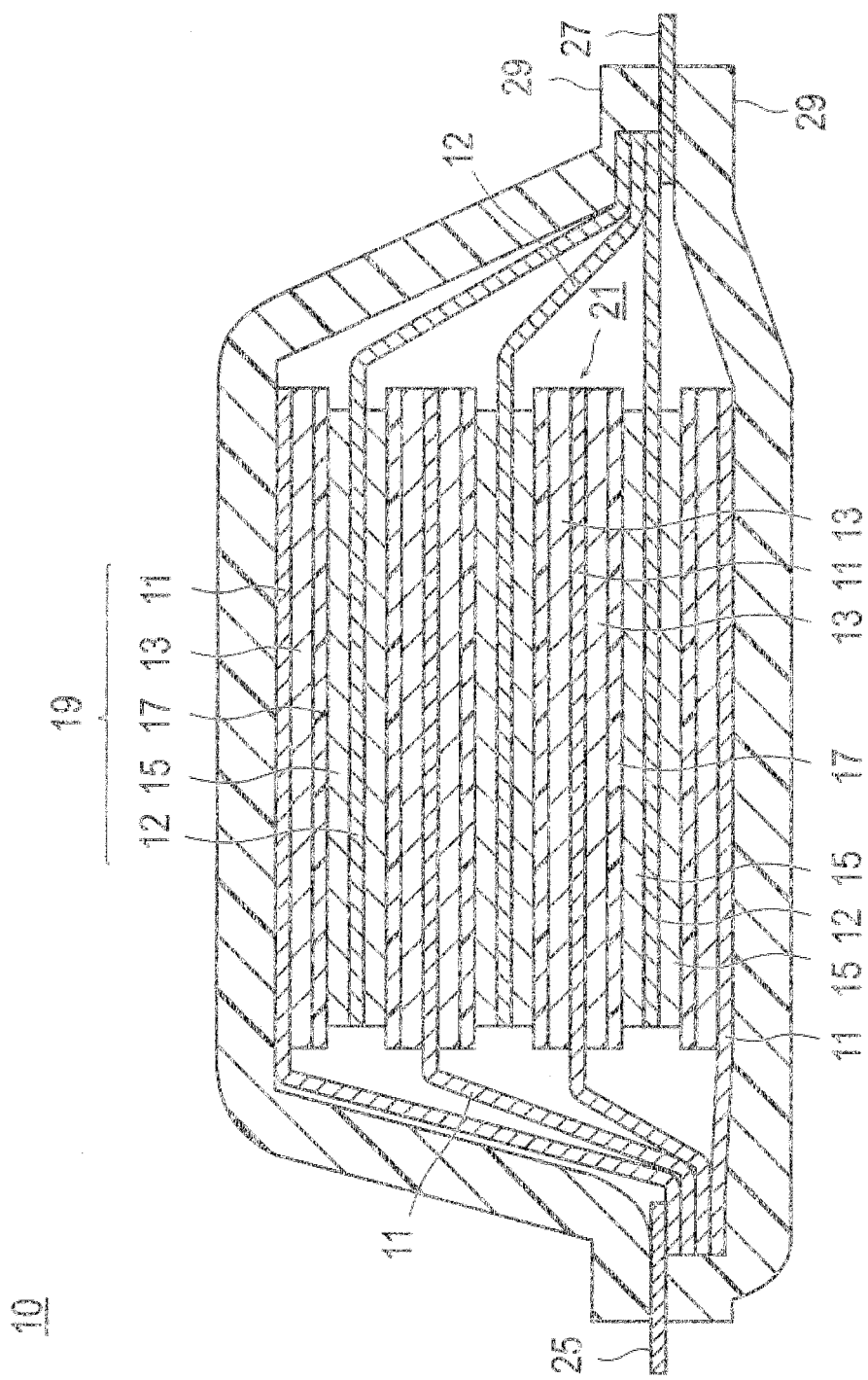
FIG. 1 is a cross-sectional view schematically illustrating the basic constitution of a non-aqueous electrolyte lithium ion secondary battery of an embodiment of the non-aqueous electrolyte lithium ion secondary battery, in which the non-aqueous electrolyte lithium ion secondary battery is a flat type (stack type) but not a bipolar type.

According to an aspect of the present invention, a positive electrode for non-aqueous electrolyte secondary battery including a positive electrode current collector and a positive electrode active material layer that is formed on a surface of the positive electrode current collector, contains a positive electrode active material and a conductive aid, and has a BET specific surface area of from 1 to 3 $m^2/g$, in which the conductive aid contains a first conductive aid and a second conductive aid having a larger average particle diameter than the first conductive aid and the content of the first conductive aid is greater than the content of the second conductive aid in the positive electrode active material layer is provided. According to the positive electrode for non-aqueous electrolyte secondary battery according to the present invention, the contact area between the electrolyte and the constituent material of the positive electrode active material layer is not too large since the BET specific surface area of the positive electrode active material layer is controlled to a predetermined range and a conductive aid having a large average particle diameter is contained in the positive electrode active material layer. For this reason, an increase in battery temperature is suppressed even in an overcharged state of the battery. On the other hand, the conductive network in the positive electrode active material layer is secured as a more amount of a conductive aid having a small average particle diameter is contained in the positive electrode active material layer. For this reason, a decrease in discharge capacity is prevented even under a high output condition, and excellent output characteristics are secured.

Hereinafter, a non-aqueous electrolyte lithium ion secondary battery will be described as a preferred embodiment of the non-aqueous electrolyte secondary battery to which the positive electrode according to the present aspect is applied, but it is not limited to the following embodiment. Incidentally, the same elements are given with the same symbols for the descriptions of the drawings, and overlapped descriptions are omitted. Further, note that dimensional ratios in the drawings are exaggerated for the sake of description, and are different from actual ratios in some cases.

FIG. 1 is a cross-sectional view schematically illustrating the basic constitution of a non-aqueous electrolyte lithium ion secondary battery which is a flat type (stack type) but not a bipolar type (hereinafter, also simply referred to as a "stack type battery"). As illustrated in FIG. 1, a stack type battery 10 according to this embodiment has a structure in which a power generating element 21 with a substantially rectangular shape, in which charge and discharge reactions actually proceed, is sealed in a battery outer casing material 29 as an outer casing body. Here, the power generating element 21 has a constitution in which a positive electrode, a separator 17, and a negative electrode are stacked. Incidentally, the separator 17 has a non-aqueous electrolyte (for example, liquid electrolyte) within it. The positive electrode has a structure in which a positive electrode active material layer 15 is disposed on both surfaces of a positive electrode current collector 12. The negative electrode has a structure in which a negative electrode active material layer 13 is disposed on both surfaces of a negative electrode current collector 11. Specifically, the negative electrode, the electrolyte layer and the positive electrode are stacked in this order such that one positive electrode active material layer 15 and the negative electrode active material layer 13 adjacent to this face each other via the separator 17. Accordingly, the adjacent positive electrode, electrolyte layer, and negative electrode constitute one single battery layer 19. Hence, it can also be said that the stack type battery 10 illustrated in FIG. 1 has a constitution that plural single battery layers 19 are stacked to be electrically connected in parallel.

Incidentally, the negative electrode active material layer 13 is disposed only on one surface of both the outermost layer positive electrode current collectors positioned on both outermost layers of the power generating element 21. However, an active material layer may be formed on both surfaces thereof. In other words, not a current collector exclusive for an outermost layer in which an active material layer is formed on only one surface is used but a current collector having an active material layer on both surfaces may be directly used as the current collector of the outermost layer. Furthermore, a positive electrode active material layer may be disposed on one surface or both surfaces of the same outermost layer positive electrode current collector by reversing the disposition of the positive electrode and negative electrode in FIG. 1 so that the outermost layer positive electrode current collector is disposed on both outermost layers of the power generating element 21.

The positive electrode current collector 12 and negative electrode current collector 11 may have a structure in which a positive electrode current collecting plate (tab) 27 and a negative electrode current collecting plate (tab) 25, which conductively communicate with each electrode (positive electrode and negative electrode), are attached to the positive electrode current collector 12 and negative electrode current collector 11 and led to the outside of the battery outer casing material 29 so as to be inserted between the end parts of the battery outer casing material 29. If necessary, each of the positive electrode current collecting plate 27 and negative electrode current collecting plate 25 may be attached to the positive electrode current collector 12 and negative electrode current collector 11 of each electrode via a positive electrode lead and a negative electrode lead (not illustrated) by ultrasonic welding, resistance welding, or the like.

Incidentally, although a stack type battery that is a flat type (stack type), but not a bipolar type, is illustrated in FIG. 1, it may be a bipolar type battery including a bipolar type electrode which has a positive electrode active material layer electrically bound to one surface of a current collector and a negative electrode active material layer electrically bound to the opposite surface of the current collector. In this case, one current collector plays roles of both the positive electrode current collector and the negative electrode current collector.

Hereinafter, the respective members will be described in more detail.

[Positive Electrode]

The positive electrode is one which includes a positive electrode current collector and a positive electrode active material layer formed on the surface of the positive electrode current collector.

(Positive Electrode Current Collector)

The material constituting the positive electrode current collector is not particularly limited, but a metal is suitably used. Specific examples of the metal may include aluminum, nickel, iron, stainless, titanium, copper, and an alloy. In addition to these, a clad material of nickel and aluminum, a clad material of copper and aluminum, or a plating material of a combination of these metals can be preferably used. In addition, it may be a foil obtained by coating aluminum on a metal surface. Among them, aluminum, stainless, and copper are preferable from the viewpoint of the electron conductivity or the potential for operating the battery.

The size of the current collector is decided based on the use of the battery. A current collector having a large area is used, for example, when the current collector is used in a large-size battery which requires a high energy density. The thickness of the current collector is not particularly limited as well. The thickness of the current collector is generally about from 1 to 100 μm.

(Positive Electrode Active Material Layer)

Positive Electrode Active Material

The positive electrode active material layer contains a positive electrode active material. The specific constitution of the positive electrode active material is not particularly limited, and a material known in prior art can be used. As an example, it is preferable that the positive electrode active material contains spinel type lithium manganese composite oxide and/or a lithium nickel-based composite oxide. Hereinafter, a preferred form of these positive electrode active materials will be described.

Spinel Type Lithium Manganese Composite Oxide

Spinel type lithium manganese composite oxide typically has a composition of $LiMn_2O_4$ and is a composite oxide having a spinel structure and essentially contains lithium and manganese, and the knowledge known in prior art can be appropriately referred for the specific constitution or producing method thereof.

Spinel type lithium manganese composite oxide has a constitution of secondary particles that are formed by the aggregation of primary particles. Moreover, the average particle diameter of the secondary particles (average secondary particle diameter) is preferably from 5 to 50 μm and more preferably from 7 to 20 μm. Incidentally, the measurement of the average secondary particle diameter is conducted by a laser diffraction method.

Lithium Nickel-Based Composite Oxide

The composition of the lithium nickel-based composite oxide is not specifically limited as long as it is a composite oxide containing lithium and nickel. Typical examples of the composite oxide containing lithium and nickel may include lithium nickel composite oxide ($LiNiO_2$). However, a composite oxide in which a part of nickel atoms in lithium nickel composite oxide is substituted with other metal atoms is more preferable, and as a preferred example thereof, lithium-nickel-manganese-cobalt composite oxide (hereinafter, also simply referred to as "NMC composite oxide") has a layered crystal structure in which a lithium atom layer and a transition metal (Mn, Ni, and Co are orderly disposed) atom layer are alternately stacked via an oxygen atom layer, contains one Li atom per one transition metal M atom, thus has a Li amount to be extracted twice the amount in spinel type lithium manganese oxide, namely, a supply capacity doubles, and it can have a high capacity. In addition, lithium-nickel-manganese-cobalt composite oxide has a higher thermal stability than $LiNiO_2$, and thus it is particularly advantageous among the nickel-based composite oxides used as a positive electrode active material.

In the present specification, NMC composite oxide also includes a composite oxide in which a part of the transition metal elements is substituted with other metal elements. Examples of the other elements in that case may include Ti, Zr, Nb, W, P, Al, Mg, V, Ca, Sr, Cr, Fe, B, Ga, In, Si, Mo, Y, Sn, V, Cu, Ag, and Zn, preferably Ti, Zr, Nb, W, P, Al, Mg, V, Ca, Sr, and Cr, more preferably, Ti, Zr, P, Al, Mg, and Cr, and even more preferably Ti, Zr, Al, Mg, and Cr from the viewpoint of the improvement in cycle characteristics.

NMC composite oxide preferably has a composition represented by the General Formula: $Li_aNi_bMn_cCo_dM_xO_2$ (in the General Formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; M represents at least one kind selected from the group consisting of Ti, Zr, Nb, W, P, Al, Mg, V, Ca, Sr, and Cr) since the theoretical discharge capacity is high. Here, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that b meets $0.4 \leq b \leq 0.6$ in the General Formula (1). Incidentally, the composition of the respective elements can be measured by induction coupled plasma (ICP) spectroscopy.

In general, nickel (Ni), cobalt (Co) and manganese (Mn) are known to contribute to the capacity and output characteristics from the viewpoint of the improvement in purity and electron conductivity of the material. A part of the transition metals in the crystal lattice is substituted with Ti and the like. It is preferable that a part of transition element is substituted with other metal element and in particular, it is preferable that x meets $0 < x \leq 0.3$ in the General Formula (1) from the viewpoint of the cycle characteristics. The crystal structure is stabilized as at least one kind selected from the group consisting of Ti, Zr, Nb, W, P, Al, Mg, V, Ca, Sr and Cr is dissolved as a solid solution, thus a decrease in capacity of a battery is prevented even charge and discharge are repeated and it is believed that excellent cycle characteristics can be achieved.

With regard to NMC composite oxide, the present inventors of the present invention have found out that the influence of deformation and cracking of the composite oxide during charge and discharge described above is greater when the metal composition of nickel, manganese, and cobalt is heterogeneous as in $LiNi_{0.5}Mn_{0.3}Co_{0.2}O_2$, for example. It is believed that this is because the metal composition is heterogeneous, thus deformation is caused in stress applied to the inside of the particle during expansion and shrinkage, and cracking of the composite oxide is more easily generated. Hence, a decrease in long-term cycle characteristics is significant as compared to a composite oxide having a rich Ni abundance ratio (for example, $LiNi_{0.8}Mn_{0.1}Co_{0.1}O_2$) or a composite oxide with a homogenous abundance ratio of Ni, Mn and Co (for example, $LiNi_{0.33}Mn_{0.33}Co_{0.33}O_2$). On the other hand, it has been found out that the cycle characteristics are surprisingly improved even for a composite oxide having a heterogeneous metal composition as in $LiNi_{0.5}Mn_{0.3}Co_{0.2}O_2$ by having the constitution according to the present aspect.

Hence, a positive electrode active material of a composite oxide in which b, c, and d in the General Formula (1) satisfy $0.44 \leq b \leq 0.51$, $0.27 \leq c \leq 0.31$, and $0.19 \leq d \leq 0.26$ is preferable. It is possible to provide a battery having an excellent balance between capacity characteristics and output characteristics by having such a constitution.

The lithium nickel-based composite oxide also has a constitution that the secondary particles are formed by the aggregation of primary particles. In addition, the average particle diameter of the primary particles (average primary particle diameter) is preferably 0.9 μm or less, more preferably from 0.20 to 0.6 μm, and even more preferably from 0.25 to 0.5 μm. In addition, the average particle diameter of the secondary particles (average secondary particle diameter) is preferably from 5 to 20 μm and more preferably from 5 to 15 μm. Furthermore, the ratio of these (average secondary particle diameter/average primary particle diameter) is preferably greater than 11, more preferably from 15 to 50, and even more preferably from 25 to 40. Incidentally, the primary particles constituting the lithium nickel-based composite oxide usually have a crystal structure of hexagonal crystal system having a layered structure, but the largeness of the crystallite diameter thereof correlates with the largeness of the average primary particle diameter. Here, the "crystallite" refers to the largest group which can be regarded as a monocrystal, and it can be measured by the method to refine the structure parameters of the crystal from the diffraction intensity obtained by the powder X-ray diffraction measurement or the like. The specific values of the crystallite diameter of the primary particles constituting the lithium nickel-based composite oxide is not particularly limited, but it is preferably 1 μm or less, more preferably 360 nm or less, and even more preferably 310 nm or less from the viewpoint of lifespan characteristics. By having such a constitution, it is possible to decrease the displacement amount of the active material at the time of expansion and shrinkage, and an occurrence of micronization (cracking) of the secondary particles associated with repeated charge and discharge is suppressed, which can contribute to the improvement in cycle characteristics. Incidentally, the lower limit of the value of crystallite diameter is not particularly limited, but it is usually 20 nm or more. Here, in the present specification, the value of the crystallite diameter of the positive electrode active material particles is measured by the Rietveld method, in which the crystallite diameter is calculated from the diffraction peak intensity obtained by the powder X-ray diffraction measurement.

The tap density of the lithium nickel-based composite oxide is preferably 2.3 g/cm$^3$ or more and more preferably from 2.4 to 2.9 g/cm$^3$. By having such a constitution, high compactness of the primary particles constituting the secondary particles of the positive electrode active material is sufficiently secured, and thus the effect of improving the cycle characteristics can be maintained.

In addition, the BET specific surface area of the lithium nickel-based composite oxide is preferably from 0.1 to 1.0 m$^2$/g, more preferably from 0.3 to 1.0 m$^2$/g, and even more preferably from 0.3 to 0.7 m$^2$/g. As the specific surface area of the active material is within such a range, the reaction area of the active material is secured, the internal resistance of the battery is lowered, and thus an occurrence of polarization at the time of electrode reaction can be suppressed at the minimum level.

Furthermore, for the lithium nickel-based composite oxide, the diffraction peak of the (104) surface and the diffraction peak of the (003) surface which are obtained by the powder X-ray diffraction measurement have a diffraction peak intensity ratio ((003)/(104)) of preferably 1.28 or more and more preferably from 1.35 to 2.1. In addition, the diffraction peak integrated intensity ratio ((003)/(104)) is preferably 1.08 or more and more preferably from 1.10 to 1.45. These definitions are preferable due to the following reasons. That is, the lithium nickel-based composite oxide has a layered rock salt structure in which the Li$^+$ layer and the Ni$^{3+}$ layer are present between the oxygen layers. However, as Ni$^{3+}$ is easily reduced to Ni$^{2+}$ and the ionic radius of Ni$^{2+}$ (0.83 Å) is approximately the same as the ionic radius of Li$^+$ (0.90 Å), it is easy for Ni$^{2+}$ to be incorporated into the Li$^+$ defective site, which is generated during synthesis of the active material. Once Ni$^{2+}$ is incorporated into the Li$^+$ site, an electrochemically inert structure is locally formed, and also diffusion of Li$^+$ is inhibited. For this reason, there is a possibility that the battery charge and discharge capacity is lowered or the durability is deteriorated in the case of using an active material exhibiting low crystallinity. Hence, as an indicator of the degree of this crystallinity, the aforementioned definitions are used. Here, as a method for quantifying the crystallinity, the diffraction peak intensity ratio and the integrated intensity ratio of diffraction peak of the (003) surface to the (104) surface obtained by the crystal structure analysis using X-ray diffraction as described above are used. When these parameters satisfy the above definitions, there are fewer defects in the crystal so that a decrease in battery charge and discharge capacity or deterioration in durability can be suppressed. Incidentally, such parameters of crystallinity can be controlled by the raw material, the composition, the calcination conditions, or the like.

The lithium nickel-based composite oxide such as NMC composite oxide can be produced by selecting various known methods such as a co-precipitation method and a spray drying method. It is preferable to use a co-precipitation method since the production of the composite oxide according to the present aspect is easy. Specifically, as a method for synthesizing NMC composite oxide, NMC composite oxide can be obtained, for example, by the method described in JP-A-2011-105588, in which a nickel-cobalt-manganese composite oxide is produced by the co-precipitation method, the nickel-cobalt-manganese composite oxide is then mixed with a lithium compound, and the mixture is calcined.

Incidentally, in a case in which the positive electrode active material contains spinel type lithium manganese composite oxide and a lithium nickel-based composite oxide, the mixing ratio of these is not particularly limited, but the content of spinel type lithium manganese composite oxide is preferably from 15 to 40% by mass and more preferably from 30 to 40% by mass with respect to 100% by mass of the content of the lithium nickel-based composite oxide from the viewpoint of lifespan characteristics and cost.

Conductive Aid

In the non-aqueous electrolyte secondary battery according to the present aspect, the positive electrode active material layer essentially contains a conductive aid. Here, the "conductive aid" refers to an additive that is blended in order to improve the conductivity of the active material layer. Examples of the conductive aid may include a carbon material such as carbon black including ketjen black and acetylene black, graphite, or a carbon fiber. The electron network in the inside of the positive electrode active material layer is effectively formed when the positive electrode active material layer contains a conductive aid, which can contribute to the improvement in output characteristics of the battery.

One of the characteristics of the non-aqueous electrolyte secondary battery according to the present aspect is that the conductive aid contained in the positive electrode active material layer contains two or more kinds of conductive aids having different average particle diameters. Here, the conductive aid which has an average particle diameter smaller than the other conductive aids is referred to as the "first conductive aid" and the conductive aid having an average particle diameter greater than the other conductive aids is referred to as the "second conductive aid". Moreover, another characteristic of the non-aqueous electrolyte secondary battery according to the present aspect is that the content of the first conductive aid is greater than the content of the second conductive aid in the positive electrode active material layer. Incidentally, in a case in which three or more kinds of conductive aids having different average particle diameters are contained in the positive electrode active material layer, it should be understood that it is included in the technical scope of the present invention as long as arbitrary two conductive aids among these meet the definition described above.

The specific value of the average particle diameter of the conductive aid is not particularly limited, knowledge known in prior art can be appropriately referred to, but as an example, the average particle diameter of the first conductive aid is preferably from 1.8 to 2.5 µm and more preferably from 1.3 to 4.5 µm. In addition, the average particle diameter of the second conductive aid is preferably from 2.0 to 5.8 µm and more preferably from 3.1 to 3.8 µm. In addition, the ratio of the average particle diameter of the first conductive aid to the average particle diameter of the second conductive aid is also not particularly limited, but the ratio value of average particle diameter of first conductive aid/average particle diameter of second conductive aid is preferably 0.25 or more and less than 1 and more preferably from 0.47 to 0.8.

Incidentally, the value of the average particle diameter of the conductive aid is a value measured by a laser diffraction method.

The BET specific surface area of the conductive aid is also not particularly limited, but it is preferable that both the BET specific surface area of the first conductive aid and the BET specific surface area of the second conductive aid are from 25 to 80 cm$^2$/g, since the effect of the present invention can be remarkably exerted.

Furthermore, the content of the first conductive aid is greater than the content of the second conductive aid in the positive electrode active material layer as described above, but the ratio of these (the mass ratio of the content of first conductive aid/the content of second conductive aid) is preferably from 1.5 to 4.0 and more preferably from 2.0 to 3.0. In addition, the content of the first conductive aid in the positive electrode active material layer is preferably from 2 to 4% by mass. Furthermore, the content of the second conductive aid in the positive electrode active material layer is preferably from 1 to 2 mass %. As the contents have a value in such ranges, there is an advantage that the effect of the present invention can be remarkably exerted.

In addition, still another characteristic of the non-aqueous electrolyte secondary battery according to the present aspect is that the BET specific surface area of the positive electrode active material layer is from 1 to 3 m$^2$/g. The value of this BET specific surface area is preferably from 1.0 to 2.0 m$^2$/g, more preferably from 1.2 to 1.8 m$^2$/g, and even more preferably from 1.2 to 1.7 m$^2$/g. As the BET specific surface area has a value in such a range, there is an advantage that the effect of the present invention can be remarkably exerted.

As the technology described in JP-A-H07-122262, it is preferable to increase the specific surface area of the electrode since it can contribute to the improvement in lifespan characteristics of the battery. However, according to the research by the present inventors, it has been found out that there is a problem that the temperature of the battery increases in an overcharged state of the battery when a non-aqueous electrolyte secondary battery is constituted using an electrode having a large specific surface area (especially, the positive electrode).

The present inventors have intensively searched the factor which causes an increase in temperature as described above. As a result, it has been found out that the factor which causes such an increase in temperature is that the decomposition reaction of the electrolyte solution due to an increased surface potential of the positive electrode when the battery is in an overcharged state is accelerated as the specific surface area of the positive electrode is larger. The constitution according to the present aspect as described above has been found out on the basis of such knowledge.

According to the positive electrode of the present aspect having a constitution as described above, the contact area between the electrolyte solution and the constituent material of the positive electrode active material layer is not too large as the BET specific surface area of the positive electrode active material layer is controlled to a predetermined range and a conductive aid having a large average particle diameter is contained in the positive electrode active material layer. For this reason, an increase in battery temperature is suppressed even in an overcharged state of the battery. On the other hand, the conductive network in the positive electrode active material layer is secured as a more amount of a conductive aid having a small average particle diameter is contained in the positive electrode active material layer. For this reason, a decrease in discharge capacity is prevented even under a high output condition, and excellent output characteristics are secured.

Other Components

If necessary, the positive electrode active material layer further contains other additives such as a binder, an electrolyte (a polymer matrix, an ion conductive polymer, an electrolyte solution, and the like), and a lithium salt for enhancing ion conductivity in addition to the positive electrode active material and a conductive aid which have described above. However, the content of the material that can function as an active material is preferably from 85 to 99.5% by weight in the positive electrode active material layer and the negative electrode active material layer to be described later.

(Binder)

A binder used in the positive electrode active material layer is not particularly limited, and for example, the following materials may be mentioned. Thermoplastic polymers such as polyethylene, polypropylene, polyethylene terephthalate (PET), polyether nitrile, polyacrylonitrile, polyimide, polyamide, cellulose, carboxymethyl cellulose (CMC) and any salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber), an epoxy resin, and the like are exemplified. These binders may be used singly, or two or more kinds thereof may be used concurrently.

The amount of the binder contained in the positive electrode active material layer is not particularly limited as long as the binder can bind the active material. However, the amount of the binder is preferably from 0.5 to 15% by weight and more preferably from 1 to 10% by weight with respect to the active material layer.

Examples of the electrolyte salt (lithium salt) may include Li(C$_2$F$_5$SO$_2$)$_2$N, LiPF$_6$, LiBF$_4$, LiClO$_4$, LiAsF$_6$, and LiCF$_3$SO$_3$.

Examples of the ion conductive polymer include a polyethylene oxide (PEO)-based polymer and a polypropylene oxide (PPO)-based polymer.

The blending ratio of the components that are contained in the positive electrode active material layer and the negative electrode active material layer to be described later is not particularly limited. The blending ratio can be adjusted by appropriately referring to the known knowledge on a lithium ion secondary battery. The thickness of each active material layer is not particularly limited as well, and the known knowledge on a battery can be appropriately referred to. As an example, the thickness of each active material layer is about from 2 to 100 μm.

[Negative Electrode Active Material Layer]

The negative electrode active material layer contains a negative electrode active material, and if necessary, further contains other additives such as a conductive aid, a binder, an electrolyte (a polymer matrix, an ion conductive polymer, an electrolyte solution, and the like), and a lithium salt for enhancing ion conductivity. The other additives such as a conductive aid, a binder, an electrolyte (a polymer matrix, an ion conductive polymer, an electrolyte solution, and the like), and a lithium salt for enhancing ion conductivity are the same as those described above in the section of the positive electrode active material layer.

Examples of the negative electrode active material may include a carbon material such as graphite, soft carbon, and hard carbon, a lithium transition metal composite oxide (for example, $Li_4Ti_5O_{12}$), a metal material, and a lithium alloy-based negative electrode material. Depending on the case, two or more kinds of negative electrode active materials may be used concurrently. Preferably, a carbon material or a lithium transition metal composite oxide is used as the negative electrode active material from the viewpoint of the capacity and output characteristics. For the same reason, in the non-aqueous electrolyte secondary battery according to the present aspect, it is more preferable that the negative electrode active material contains graphite, and it is more preferable that the negative electrode active material contains graphite as a main component. Incidentally, the fact that "negative electrode active material contains graphite as a main component" means that the proportion of graphite in the negative electrode active material is 50% by weight or more. In this case, the proportion of graphite in the negative electrode active material is more preferably 70% by weight or more, even more preferably 85% by weight or more, even more preferably 90% by weight or more, even more preferably 95% by weight or more, and most preferably 100% by weight.

In addition, it is needless to say that a negative electrode active material other than those described above may also be used.

The average particle diameter of the negative electrode active material is not particularly limited, but it is preferably from 1 to 100 μm and more preferably from 1 to 20 μm from the viewpoint of an increase in output.

The negative electrode active material layer preferably contains at least an aqueous binder. The aqueous binder exhibits high binding property. In addition, procurement of water as a raw material is easy and also only water vapor is generated during drying, and thus there is an advantage that the investment on facilities of a production line can be greatly cut down and a decrease in environmental burden can be achieved.

The aqueous binder refers to a binder which has water as a solvent or a dispersion medium, and specific examples thereof include a thermoplastic resin, a polymer exhibiting rubber elasticity, a water-soluble polymer, and any mixture thereof. Here, the binder which contains water as a dispersion medium includes all which are regarded as latex or an emulsion, and it refers to a polymer that is emulsified in water or suspended in water. Examples thereof may include a polymer latex obtained by emulsion polymerization in a self-emulsifying system.

Specific examples of the aqueous binder may include a styrene polymer (styrene-butadiene rubber, a styrene-vinyl acetic acid copolymer, styrene-acryl copolymer or the like), acrylonitrile-butadiene rubber, methyl methacrylate-butadiene rubber, (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is suitably from 200 to 4000 and more suitably from 1000 to 3000, and the saponification degree is suitably 80% by mol or more and more suitably 90% by mol or more) and any modified product thereof (a product obtained by saponifying from 1 to 80% by mol of the vinyl acetate units in a copolymer of ethylene/vinyl acetate=2/98 to 30/70 (molar ratio), a product obtained by partially acetalizing polyvinyl alcohol at from 1 to 50% by mol, or the like), starch and any modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and any salt thereof), polyvinylpyrrolidone, polyacrylic acid (salt), polyethylene glycol, a copolymer of (meth)acrylamide and/or a (meth)acrylate salt [(meth)acrylamide polymer, a (meth)acrylamide-(meth)acrylate salt copolymer, a (meth)acrylic acid alkyl (having from 1 to 4 carbon atoms) ester-(meth)acrylate salt copolymer, or the like], a styrene-maleate salt copolymer, a mannich modified product of polyacrylamide, a formalin condensation type resin (a urea-formalin resin, a melamin-formalin resin or the like), a polyamide polyamine or dialkylamine-epichlorohydrin copolymer, polyethyleneimine, casein, soybean protein, synthetic protein, and a water-soluble polymer such as any mannan galactan derivative. These aqueous binders may be used singly or two or more kinds thereof may be used concurrently.

From the viewpoint of binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Furthermore, the aqueous binder preferably contains styrene-butadiene rubber since the binding property thereof is favorable.

In the case of using styrene-butadiene rubber as the aqueous binder, it is preferable to concurrently use the aforementioned water-soluble polymer from the viewpoint of the improvement in coating property. Examples of the water-soluble polymer which is suitably concurrently used with styrene-butadiene rubber may include polyvinyl alcohol and any modified product thereof, starch and any modified product thereof, cellulose derivatives (carboxymethyl cellulose, methyl cellulose, hydroxyethyl cellulose, and any salt thereof), polyvinylpyrrolidone, polyacrylic acid (salt), or polyethylene glycol. Among them, styrene-butadiene rubber and carboxymethyl cellulose (salt) are preferably combined as a binder. The weight content ratio of the styrene-butadiene rubber to the water-soluble polymer is not particularly limited, but it is preferable that the ratio of styrene-butadiene rubber:water-soluble polymer is 1:0.1 to 10 and more preferably from 0.5 to 2.

In the binder used in the negative electrode active material layer, the content of the aqueous binder is preferably from 80 to 100% by weight, preferably from 90 to 100% by weight, and preferably 100% by weight.

[Separator (Electrolyte Layer)]

A separator has a function to hold the electrolyte so as to secure the lithium ion conductivity in between the positive electrode and the negative electrode and also a function as a partition wall between the positive electrode and the negative electrode.

Examples of the separator shape may include a porous sheet separator or a non-woven separator composed of a polymer or a fiber which absorbs and holds the electrolyte.

As the porous sheet separator composed of a polymer or a fiber, a microporous (microporous membrane) separator can be used, for example. Specific examples of the porous sheet composed of a polymer or a fiber may include a microporous (microporous membrane) separator which is composed of a polyolefin such as polyethylene (PE) or polypropylene (PP); a laminate in which a plurality of these are laminated (for example, a laminate having a three-layer structure of PP/PE/PP), and a hydrocarbon-based resin such as polyimide, aramid, or polyvinylidene fluoride-hexafluoropropylene (PVdF-HFP), or a glass fiber.

The thickness of the microporous (microporous membrane) separator cannot be uniformly defined as it varies depending on the use. For example, for use in a secondary battery for driving a motor of an electric vehicle (EV), a hybrid electric vehicle (HEV), a fuel cell vehicle (FCV), and the like, it is preferably from 4 to 60 µm as a monolayer or a multilayer. Fine pore diameter of the microporous (microporous membrane) separator is preferably 1 µm or less at most (usually, the pore diameter is about several tens of nanometers).

As the non-woven separator, those known in prior art, such as cotton, rayon, acetate, nylon, polyester; a polyolefin such as PP or PE; polyimide and aramid are used singly or as a mixture. In addition, the bulk density of the non-woven fabric is not particularly limited as long as sufficient battery characteristics are obtained by a polymer gel electrolyte impregnated into the non-woven fabric. Furthermore, it is sufficient that the thickness of the non-woven separator is the same as that of the electrolyte layer. It is preferably from 5 to 200 µm and even more preferably from 10 to 100 µm.

In addition, as described above, the separator also contains an electrolyte. The electrolyte is not particularly limited as long as it can exhibit such functions, but a liquid electrolyte or a gel polymer electrolyte may be used. The distance between electrodes is stabilized, an occurrence of polarization is suppressed, and the durability (cycle characteristics) is improved as a gel polymer electrolyte is used.

The liquid electrolyte has a function as a carrier of lithium ion. The liquid electrolyte constituting the electrolyte solution layer has a form in which a lithium salt as a supporting salt is dissolved in an organic solvent as a plasticizer. Examples of the organic solvent which can be used may include carbonates such as ethylene carbonate (EC), propylene carbonate (PC), dimethyl carbonate (DMC), diethyl carbonate (DEC), or ethylmethyl carbonate. Furthermore, as the lithium salt, a compound which can be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be adopted in the same manner. The liquid electrolyte may further contain an additive in addition to the components that are described above. Specific examples of such a compound may include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxymethyl ethylene carbonate, propargyloxyethylene carbonate, methylene ethylene carbonate, and 1,1-dimethyl-2-methyleneethylene carbonate. Among them, vinylene carbonate, methyl vinylene carbonate, and vinyl ethylene carbonate are preferable, and vinylene carbonate and vinyl ethylene carbonate are more preferable. These cyclic carbonate esters may be used singly or two or more kinds thereof may be used concurrently.

The gel polymer electrolyte has a constitution that the aforementioned liquid electrolyte is injected into a matrix polymer (host polymer) consisting of an ion conductive polymer. Using a gel polymer electrolyte as an electrolyte is excellent in that the fluidity of the electrolyte disappears and ion conductivity between the respective layers is blocked. Examples of the ion conductive polymer which is used as the matrix polymer (host polymer) may include polyethylene oxide (PEO), polypropylene oxide (PPO), polyethylene glycol (PEG), polyacrylronitrile (PAN), polyvinylidene fluoride-hexafluoropropylene (PVdF-HEP), poly(methyl methacrylate (PMMA) and any copolymer thereof.

The matrix polymer of a gel electrolyte can exhibit an excellent mechanical strength as it forms a cross-linked structure. In order to form a cross-linked structure, it is sufficient to conduct a polymerization treatment, such as thermal polymerization, UV polymerization, radiation polymerization, or electron beam polymerization, of a polymerizable polymer for forming a polymer electrolyte (for example, PEO or PPO) using a proper polymerization initiator.

In addition, as a separator, a separator in which a heat resistant insulating layer is laminated on a porous substrate (a separator with heat resistant insulating layer) is preferable. The heat resistant insulating layer is a ceramic layer containing inorganic particles and a binder. As the separator with heat resistant insulating layer, those exhibiting high heat resistance, namely having a melting point or a heat softening point of 150° C. or higher and preferably 200° C. or higher, are used. By having a heat resistant insulating layer, internal stress of the separator which increases when the temperature increases is alleviated so that the effect of suppressing thermal shrinkage can be obtained. As a result, an occurrence of a short circuit in between electrodes of the battery can be prevented so that a battery configuration in which the deterioration in performance due to an increase in temperature hardly occurs is obtained. In addition, by having a heat resistant insulating layer, the mechanical strength of the separator with heat resistant insulating layer is improved so that the membrane of the separator is hardly broken. Furthermore, because of the effect of suppressing thermal shrinkage and a high mechanical strength, the separator is hardly curled during the manufacturing process of the battery.

The inorganic particles in the heat resistant insulating layer contribute to the mechanical strength or the effect of suppressing thermal shrinkage of the heat resistant insulating layer. The material used as the inorganic particles is not particularly limited. Examples thereof may include oxides ($SiO_2$, $Al_2O_3$, $ZrO_2$, and $TiO_2$), hydroxides, and nitrides of silicon, aluminum, zirconium and titanium, and any composite thereof. These inorganic particles may be those which are derived from mineral resources such as boehmite, zeolite, apatite, kaolin, mullite, spinel, olivine, and mica, or those which are artificially synthesized. In addition, these inorganic particles may be used singly or two or more kinds thereof may be used concurrently. Among them, it is preferable to use silica ($SiO_2$) or alumina ($Al_2O_3$) and it is more preferable to use alumina ($Al_2O_3$) from the viewpoint of cost.

The weight per unit area of heat resistant particles is not particularly limited, but it is preferably from 5 to 15 $g/m^2$. It is desirable that the weight per unit area is within this range since sufficient ion conductivity is obtained and the heat resistant strength is maintained.

The binder in the heat resistant insulating layer has a role to bond the inorganic particles to one another or the inorganic particles to the resin porous substrate layer. The heat resistant insulating layer is stably formed by this binder and also peeling between the porous substrate layer and the heat resistant insulating layer is prevented.

The binder used in the heat resistant insulating layer is not particularly limited, and for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, carboxymethyl cellulose (CMC), methyl acrylate, or polyvinylidene fluoride (PVDF) is preferably used. These compounds may be used singly or two or more kinds thereof may be used concurrently.

The content of the binder in the heat resistant insulating layer is preferably from 2 to 20% by weight with respect to 100% by weight of the heat resistant insulating layer. When the content of binder is 2% by weight or more, the peeling strength between the heat resistant insulating layer and the porous substrate layer can be enhanced and vibration resistance of the separator can be improved. Incidentally, when the content of binder is 20% by weight or less, a gap between the inorganic particles is properly kept so that sufficient lithium ion conductivity can be secured.

It is preferable that the thermal shrinkage rate of the separator with heat resistant insulating layer is 10% or less in both MD and TD after being held for 1 hour under the condition of 150° C. and 2 $gf/cm^2$. Shrinkage of the separator can be effectively prevented even when the internal temperature of the battery reaches 150° C. due to an increased amount of heat generated from the positive electrode as such a highly heat resistant material is used. As a result, an occurrence of a short circuit in between electrodes of the battery can be prevented so that a battery configuration in which the deterioration in performance due to an increase in temperature hardly occurs is obtained.

[Positive Electrode Current Collecting Plate and Negative Electrode Current Collecting Plate]

The material constituting the current collecting plates (25, 27) is not particularly limited, and a known highly conductive material which has been used as a current collecting plate for a lithium ion secondary battery in prior art can be used. Preferred examples of the material constituting the current collecting plate may include metal materials such as aluminum, copper, titanium, nickel, stainless steel (SUS) and any alloy thereof. From the viewpoint of light weightiness, resistance to corrosion, and high conductivity, aluminum and copper are more preferable. Aluminum is even more preferable. Incidentally, the same material or different materials may be used in the positive electrode current collecting plate 27 and the negative electrode current collecting plate 25.

[Positive Electrode Lead and Negative Electrode Lead]

In addition, although it is not illustrated, the current collector 11 and the current collecting plate (25, 27) may be electrically connected to each other via a positive electrode lead or a negative electrode lead. A known material that is used in a lithium ion secondary battery of prior art can be used as the material constituting the positive electrode lead and the negative electrode lead in the same manner. Incidentally, a portion taken out from the outer casing is preferably coated with a heat resistant and insulating thermally shrunken tube or the like so that it is not in contact with the neighboring device or wire to cause electric leakage which affects the product (for example, an automobile component, in particular, an electronic device).

[Battery Outer Casing Body]

As the battery outer casing body 29, an envelope-shaped casing which can cover the power generating element and uses a laminate film containing aluminum, can be used in addition to a known metal can casing. As the laminate film, a laminate film having a three-layer structure formed by laminating PP, aluminum, and nylon in this order can be used, but it is not limited thereto. A laminate film is preferable from the viewpoint of an increase in output and excellent cooling performance and of being suitably utilizable in a battery for a large-size device such as EV or HEV. In addition, an aluminate laminate is more preferable as the outer casing body since the group pressure applied from the outside to the power generating element can be easily adjusted and thus the thickness of an electrolyte solution layer can be easily adjusted to a desired value.

[Cell Size]

Figure 2:
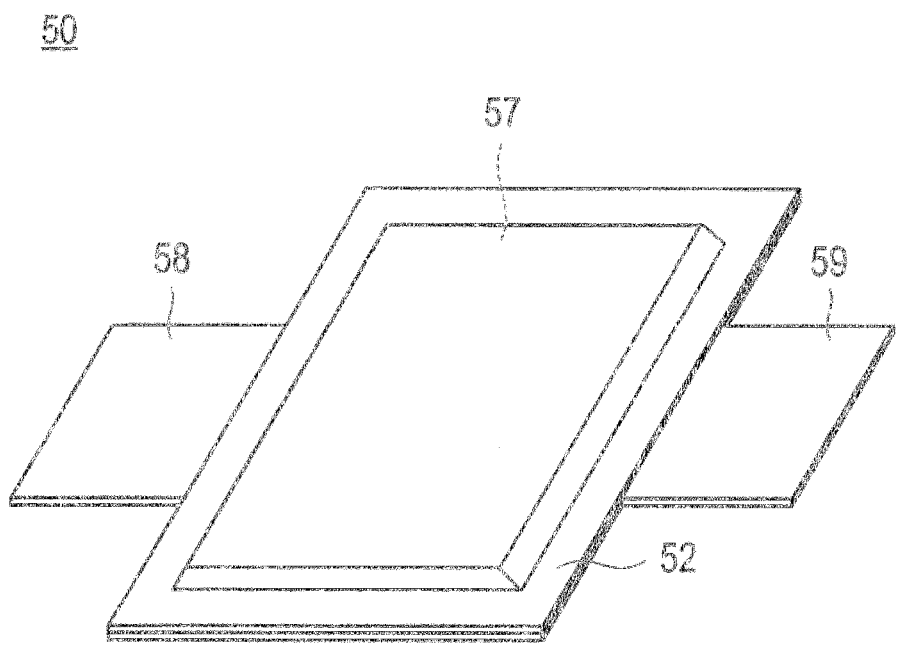
FIG. 2 is a perspective view illustrating the appearance of a flat lithium ion secondary battery as a representative embodiment of a secondary battery.

FIG. 2 is a perspective view illustrating the appearance of a flat lithium ion secondary battery as a representative embodiment of a secondary battery. According to a preferred embodiment of the present invention, a flat stack type laminate battery having a constitution in which the power generating element is sealed in the battery outer casing body formed of a laminate film containing aluminum such as this lithium ion secondary battery is provided.

As illustrated in FIG. 2, a flat lithium ion secondary battery 50 has a rectangular flat shape, and a positive electrode tab 58 and a negative electrode tab 59 are taken out from both sides for extracting the electric power. A power generating element 57 is covered with a battery outer casing material 52 of the lithium ion secondary battery 50, and the periphery of the battery outer casing material 52 is fused by heat. The power generating element 57 is sealed in a state in which the positive electrode tab 58 and the negative electrode tab 59 are taken out to the outside. Here, the power generating element 57 corresponds to the power generating element 21 of the lithium ion secondary battery 10 illustrated in FIG. 1 described above. The power generating element 57 is one in which plural single battery layers (single cell) 19, which are each constituted by the positive electrode (positive electrode active material layer) 15, the electrolyte layer 17, and the negative electrode (negative electrode active material layer) 13, are stacked.

Incidentally, the lithium ion secondary battery is not limited to those having a flat shape of a stack type. The winding type lithium ion secondary battery may be those having a barrel shape or those having a rectangular flat shape obtained by modifying those having a barrel shape, and it is not particularly limited. A laminate film may be used as the outer casing material of those having a barrel shape, and a barrel can (metal can) of prior art may be used, and it is not particularly limited. Preferably, the power generating element is encased with an aluminum laminate film. Weight saving can be attained by such a form.

In addition, the taking out of the tabs 58 and 59 illustrated in FIG. 2 is not particularly limited as well. The positive electrode tab 58 and the negative electrode tab 59 may be taken out from the same side or each of the positive electrode tab 58 and negative electrode tab 59 may be divided into plural tabs and then taken out from each side, and it is not limited to the form illustrated in FIG. 2. In addition, it is also possible to form a terminal utilizing, for example, a barrel can (metal can) instead of a tab in a winding type lithium ion battery.

A general electric vehicle has a battery storage space of about 170 L. A cell and an auxiliary machine such as a device for controlling charge and discharge are stored in this space, and thus the storage space efficiency of a common cell is about 50%. The cell loading efficiency into this space is a factor to determine the cruising distance of an electric vehicle. The loading efficiency is impaired as the size of a single cell decreases, and thus it is impossible to secure the cruising distance.

Hence, in the present invention, the battery structure of which the power generating element is covered with an outer casing body preferably has a large size. Specifically, the length of the short side of a laminate cell battery is preferably 100 mm or more. Such a large-size battery can be used in a vehicle use. Here, the length of the short side of a laminate cell battery refers to the length of the shortest side. The upper limit of the length of the short side is not particularly limited, but it is usually 400 mm or less.

[Volume Energy Density and Rated Discharge Capacity]

According to the market requirement, a general electric vehicle needs to have a driving distance (cruising distance) of 100 km or more per single charge. Considering such a cruising distance, the volume energy density of a battery is preferably 157 Wh/L or more and the rated capacity is preferably 20 Wh or more.

Here, an increase in size of a battery is defined from the relation of the battery area or the battery capacity in the non-aqueous electrolyte secondary battery using the positive electrode according to the present aspect as the viewpoint of a large-sized battery that is different from the viewpoint of the physical size of the electrode. Specifically, the non-aqueous electrolyte secondary battery according to the present aspect is preferably a flat and stack type laminate battery which has a ratio value of the battery area (projected area of the battery including the battery outer casing body) to the rated capacity of 5 cm$^2$/Ah or more and a rated capacity of 3 Ah or more. The problem of an increase in temperature of the battery when the battery is in an overcharged state as described above is even more significant when the battery has a large area and a large capacity in this manner. On the other hand, in the case of a battery, which does not have a large area and a large capacity as described above, such as a consumer battery of prior art, the problem of an increase in temperature of the battery is not that significant even if the battery is in an overcharged state.

Furthermore, the aspect ratio of a rectangular electrode is preferably from 1 to 3 and more preferably from 1 to 2. Incidentally, the aspect ratio of an electrode is defined by the length/width ratio of a positive electrode active material layer with a rectangular shape. As the aspect ratio is in this range, an advantage of having both the performance required for a vehicle and mounting space can be achieved.

[Assembled Battery]

An assembled battery is constituted by connecting plural batteries. In detail, the assembled battery is one which is constituted by connecting at least two or more batteries in series, in parallel, or in series and parallel. It is possible to freely control the capacity and voltage by connecting the batteries in series and in parallel.

It is also possible to form a detachable small-size assembled battery by connecting plural batteries in series or in parallel. Moreover, by further connecting plural detachable small-size assembled batteries in series or parallel, it is possible to form an assembled battery having a high capacity and a high output which is suitable as a power source or an auxiliary power source for driving a vehicle requiring a high volume energy density and a high volume output density. The number of the connected batteries for fabricating an assembled battery or the number of the stacked small-size assembled batteries for fabricating an assembled battery having a high capacity can be determined depending on the capacity or output of the battery that is mounted to a vehicle (electric vehicle).

[Vehicle]

The non-aqueous electrolyte secondary battery according to the present embodiment can maintain a discharge capacity even when being used for a long period of time and thus exhibits favorable cycle characteristics. Furthermore, it has a high volume energy density. For use in a vehicle such as an electric vehicle, a hybrid electric vehicle, a fuel cell electric vehicle, or a hybrid fuel cell electric vehicle, a long lifespan is required as well as a high capacity and a large size compared to use in an electric and mobile electronic device. Hence, the non-aqueous electrolyte secondary battery can be suitable utilized as a power source for a vehicle, for example, as a power source or as an auxiliary power source for driving a vehicle.

Specifically, the battery or the assembled battery formed by combining plural batteries can be mounted on a vehicle. According to the present invention, a battery exhibiting excellent long term reliability, output characteristics, and a long lifespan can be formed, and thus, by mounting such a battery, a plug-in hybrid electric vehicle having a long EV driving distance and an electric vehicle having a long driving distance per one charge can be constituted. This is because a vehicle having a long lifespan and high reliability can be provided as the battery or an assembled battery formed by combining plural batteries is used in, for example, a vehicle such as a hybrid car, a fuel cell electric car, or an electric car (including a two-wheel vehicle (motor bike) or a three-wheel vehicle in addition to all four-wheel vehicles (a passenger vehicle, a truck, a commercial vehicle such as a bus, a compact car, or the like)). However, the use is not limited to a vehicle, and it can be applied to various kinds of power sources of other vehicles, for example, a moving object such as an electric train, and it can be also utilized as a built-in power source of an uninterruptable power source unit.

Example

The present invention will be described in more detail with reference to Examples and Comparative Examples, but the present invention is not limited to the following Examples in any way.

Comparative Example 1

(1) Fabrication of Positive Electrode

A slurry of positive electrode active material was prepared by mixing carbon black (average particle size: 2.2 μm) as the first conductive aid at 1% by mass, graphite (average particle size: 3.4 μm) as the second conductive aid at 1% by mass, polyvinylidene fluoride (PVDF) as the binder at 4% by mass, lithium nickel composite oxide as the positive electrode active material for the remainder (the sum of the conductive aid, the binder, and the positive electrode active material is 100% by mass), and N-methyl-2-pyrrolidone (NMP) as the slurry viscosity adjusting solvent in an appropriate amount. Subsequently, the slurry of positive electrode active material thus obtained was coated on an aluminum foil (thickness: 20 μm) as a current collector, dried for 3 minutes at 120° C., and subjected to compression molding using a roll press machine, thereby forming a positive electrode active material layer having a planar shape of a rectangle. The positive electrode active material layer was also formed on the back surface of the aluminum foil in the same manner, thereby fabricating a positive electrode having a positive electrode active material layer formed on both surfaces of a positive electrode current collector (aluminum foil). Incidentally, the coating amount of the positive electrode active material layer on one surface was 20 mg/cm$^2$ (not including foil). The positive electrode of the present Comparative Example was fabricated in this manner.

(2) Fabrication of Negative Electrode

A slurry of negative electrode active material was prepared by dispersing graphite as the negative electrode active material at 94% by mass, carbon black as the conductive aid at 1% by mass, polyvinylidene fluoride (PVDF) as the binder at 5% by mass. This slurry of negative electrode active material thus obtained was coated on a copper foil (thickness: 10 μm) as the negative electrode current collector, dried for 3 minutes at 120° C., and subjected to compression molding using a roll press machine, thereby forming a negative electrode active material layer. The negative electrode active material layer was also formed on the back surface of the copper foil in the same manner, thereby fabricating a negative electrode having a negative electrode active material layer formed on both surfaces of a negative electrode current collector (copper foil). Incidentally, the coating amount of the negative electrode active material layer was adjusted to be 9 mg/cm$^2$. The negative electrode of the present Comparative Example was fabricated in this manner.

(3) Fabrication of Cell for Test

A power generating element was fabricated by alternately stacking the positive electrode fabricated in (1) above and the negative electrode fabricated in (2) above (positive electrode: 3 layers and negative electrode: 4 layers) via a separator (thickness: 25 μm, Celgard #2500, manufactured by Polypore, International, Inc.). The power generating element thus obtained was placed in an aluminum laminate sheet bag of an outer casing, and an electrolyte solution was injected thereinto. As the electrolyte solution, a solution in which vinylene carbonate as an additive was added at 1% by mass with respect to 100% by weight of a solution prepared by dissolving 1.0 M LiPF$_6$ in a mixed solvent of ethylene carbonate (EC) and diethyl carbonate (DEC) of 3:7 (volume ratio of EC:DEC) was used. Subsequently, under a vacuum condition, the opening of the aluminum laminate sheet bag was sealed such that the electric current extracting tabs that were connected to both electrodes, were led to outside, thereby completing the cell for test of a laminated type lithium ion secondary battery. The cell for test (flat-plate stack (flat) type laminate battery) of the present Comparative Example was fabricated in this manner.

Examples 1 to 5 and Comparative Examples 2 to 5

The cells for test of Examples 1 to 5 and Comparative example 2 to 5 were fabricated by the same method as in Comparative Example 1 described above except that the contents of the first conductive aid and the second conductive aid were changed to the values presented in the following Table 1.

[Evaluation]

(BET Specific Surface Area of Positive Electrode Active Material Layer)

The BET specific surface area of the positive electrode active material layer of the positive electrode used in fabrication of the respective cells for test fabricated above. The results are presented in the following Table 1.

(Lifespan Characteristics)

The lifespan characteristics were evaluated for the respective cells for test fabricated above.

Specifically, the lifespan characteristics were evaluated by 1 C rate charge and discharge cycle under a temperature condition of 45° C. The results are presented in the following Table 1. Incidentally, in the results of the lifespan characteristics presented in Table 1, the symbol "○" means that the capacity retention rate after 300 cycles was 90% or more and the symbol "x" means that the capacity retention rate after 300 cycles was less than 90%.

(Overcharge Characteristics)

The overcharge characteristics were evaluated for the respective cells for test fabricated above.

Specifically, the cells for test were charged under the CC/CV conditions of 150 A and 5.7 V, and "○" was denoted to those of which the temperature at that time did not reach 120° C. and "x" was denoted to those of which the temperature at that time reached 120° C.

TABLE 1

| | Content of conductive aid | | Evaluation on characteristics | | BET specific surface area of positive electrode |
| --- | --- | --- | --- | --- | --- |
| | First conductive aid (% by mass) | Second conductive aid (% by mass) | Lifespan characteristics | Overcharge characteristics | active material layer (m$^2$/g) |
| Comparative Example 1 | 1 | 1 | X | ○ | 0.83 |
| Example 1 | 2 | 1 | ○ | ○ | 1.38 |
| Example 2 | 3 | 1 | ○ | ○ | 1.94 |

TABLE 1-continued

|  | Content of conductive aid | | Evaluation on characteristics | | BET specific surface area of positive electrode |
|---|---|---|---|---|---|
|  | First conductive aid (% by mass) | Second conductive aid (% by mass) | Lifespan characteristics | Overcharge characteristics | active material layer (m²/g) |
| Example 3 | 3 | 2 | ○ | ○ | 2.43 |
| Example 4 | 4 | 1 | ○ | ○ | 2.49 |
| Example 5 | 4 | 2 | ○ | ○ | 2.98 |
| Comparative Example 2 | 5 | 1 | ○ | X | 3.04 |
| Comparative Example 3 | 4 | 3 | ○ | X | 3.47 |
| Comparative Example 4 | 5 | 2 | ○ | X | 3.53 |
| Comparative Example 5 | 6 | 1 | ○ | X | 3.59 |

From the results presented in Table 1, it was not possible to attain sufficient lifespan characteristics in Comparative Example 1 in which the content of the first conductive aid was equal to that of the second conductive aid and the BET specific surface area was less than 1 m²/g. It is believed that this is because the amount of the conductive aid having a small particle diameter was not enough and thus the conductive network was not sufficiently secured in the positive electrode active material layer. In addition, it can be seen that the overcharge characteristics are not sufficient in Comparative Examples 2 to 5 in which the BET specific surface area of the positive electrode active material layer was greater than 3 m²/g. It is believed that this is because the contact area between the electrolyte solution and the constituent material of the positive electrode active material layer was too large and thus the decomposition reaction of the electrolyte solution excessively proceeded when the positive electrode surface was in a high potential state.

On the other hand, it can be seen that the cells for test of Examples 1 to 5 in which the positive electrode for non-aqueous electrolyte secondary battery according to the present invention was used exhibited excellent lifespan characteristics and excellent overcharge characteristics.

The invention claimed is:

1. A non-aqueous electrolyte secondary battery comprising: a power generating element comprising:
   a positive electrode comprising:
   a positive electrode current collector; and
   a positive electrode active material layer that is formed on a surface of the positive electrode current collector, comprising a positive electrode active material comprising a lithium nickel-based composite oxide having a BET specific surface area of from 0.1 to 1.0 m²/g, and a conductive aid, the positive active material layer having a BET specific surface area of from 1.2 to 1.8 m²/g; a negative electrode comprising a negative electrode current collector, and
   a negative electrode active material layer comprising a negative electrode active material of a carbon material that is formed on a surface of the negative electrode current collector; and
   a separator, wherein
   the conductive aid comprises a first conductive aid having an average particle diameter from 1.3 to 2.5 μm and a second conductive aid having an average particle diameter of 3.1 to 3.8 μm,
   wherein the first conductive aid and the second conductive aid are each one of carbon black, ketjen black, acetylene black, graphite or carbon fiber,
   a content of the first conductive aid is greater than a content of the second conductive aid in the positive electrode active material layer,
   a mass ratio of the content of the first conductive aid/the content of the second conductive aid is from 2.0 to 3.0,
   the positive electrode active material layer has a rectangular shape with a width from 100 mm to 400 mm, and an aspect ratio defined as a length/width ratio of the rectangular shaped positive electrode active material layer is from 1 to 3,
   a ratio of a battery area (projected area of a battery including a battery outer casing body) to a rated capacity is 5 cm²/Ah or more, and the rated capacity is 3 Ah or more.

2. The non-aqueous electrolyte secondary battery according to claim 1, wherein the content of the first conductive aid in the positive electrode active material layer is from 2 to 4% by mass and the content of the second conductive aid in the positive electrode active material layer is from 1 to 2% by mass.

3. The non-aqueous electrolyte secondary battery according to claim 1, wherein both of the BET specific surface area of the first conductive aid and the BET specific surface area of the second conductive aid are from 25 to 80 m²/g.

4. The non-aqueous electrolyte secondary battery according to claim 1, wherein the positive electrode active material comprises a spinel type lithium manganese composite oxide and the lithium nickel-based composite oxide, and the content of the spinel type lithium manganese composite oxide is from 15 to 40% by mass with respect to 100% by mass of the content of the lithium nickel-based composite oxide.

5. The non-aqueous electrolyte secondary battery according to claim 1, wherein the crystallite diameter of the lithium nickel-based composite oxide is 360 nm or less.

6. The non-aqueous electrolyte secondary battery according to claim 1, wherein the lithium nickel-based composite oxide has a composition represented by the General Formula: $Li_aNi_bMn_cCo_dM_xO_2$ (in the General Formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; M represents at least one kind selected from the group consisting of Ti, Zr, Nb, W, P, Al, Mg, V, Ca, Sr, and Cr).

7. The non-aqueous electrolyte secondary battery according to claim 6, wherein b, c and d are to be $0.44 \leq b \leq 0.51$, $0.27 \leq c \leq 0.31$, and $0.19 \leq d \leq 0.26$.

8. The non-aqueous electrolyte secondary battery according to claim 1, wherein the negative electrode active material comprises graphite as a main component.

9. The non-aqueous electrolyte secondary battery according to claim 1, wherein the separator is a separator with a heat resistant insulating layer.

10. The non-aqueous electrolyte secondary battery according to claim 1, wherein the non-aqueous electrolyte secondary battery is a flat stack type laminate battery having a constitution that the power generating element is sealed in a battery outer casing body formed of a laminate film comprising aluminum.

11. The non-aqueous electrolyte secondary battery according to claim 1, wherein the ratio of the average particle diameter of the first conductive aid to the average particle diameter of the second conductive aid is from 0.47 to 0.8.

* * * * *